Nov. 14, 1939.   J. F. LAWSON   2,179,940
AUTOMATIC DAMPER
Filed Nov. 23, 1935
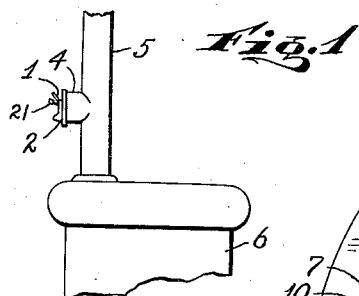
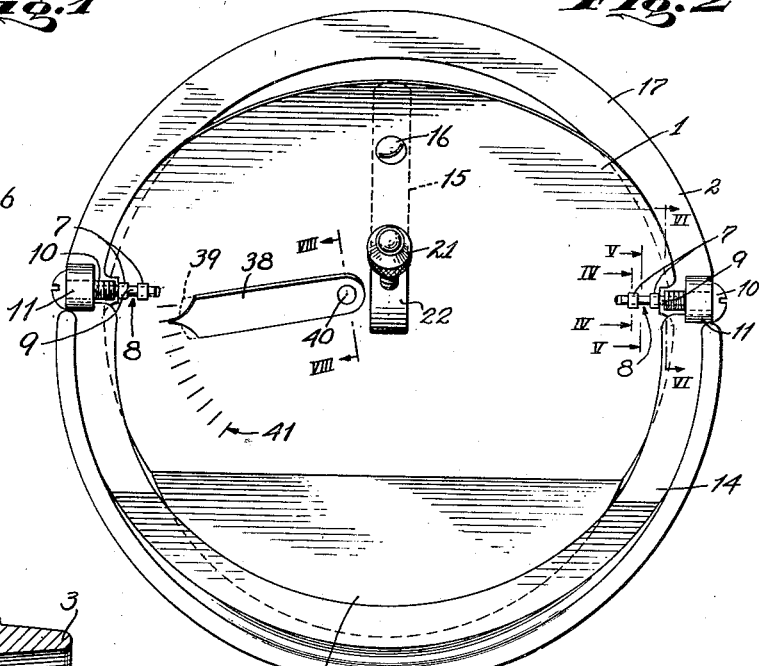
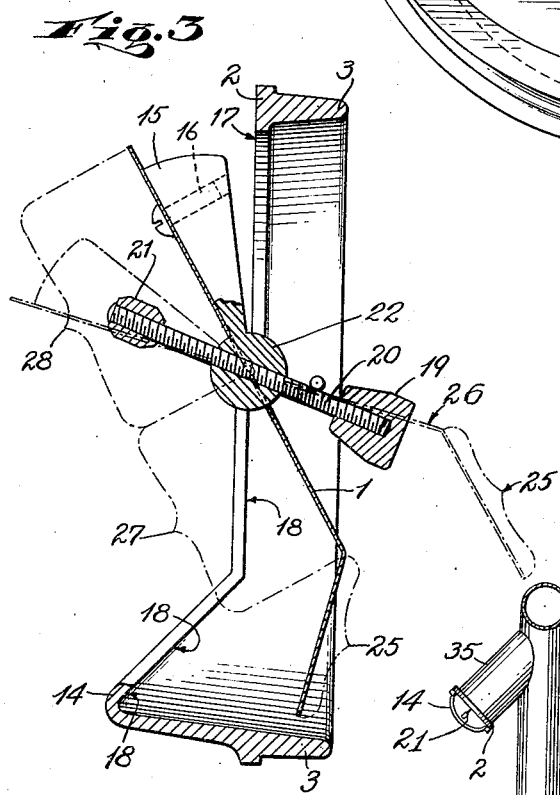
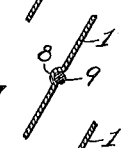
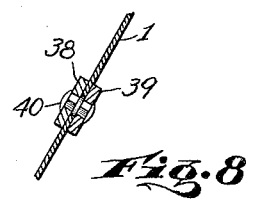
INVENTOR
John F. Lawson
BY
Jeffery, Kimball & Eggleston
ATTORNEYS Patented Nov. 14, 1939

2,179,940

UNITED STATES PATENT OFFICE 2,179,940

AUTOMATIC DAMPER

John F. Lawson, Nutley, N. J.

Application November 23, 1935, Serial No. 51,217

6 Claims. (Cl. 236—45)

My invention relates to automatic dampers, that is to say, to valves that open and close automatically under the action of the flow of fluid through them and that are used commonly for the purpose of establishing a desired difference or differences between the pressures at their two sides. In the specific form here illustrated, it relates to hinged or swinging automatic dampers to keep the effect of the suction or draft of chimneys on furnaces constant. My invention is not entirely limited to such uses however, but in general it is applicable quite or substantially wherever it is desired to control pressure differences by controlling the rate of fluid flow resulting from the pressure difference, all as will be apparent.

Generally speaking my invention provides dampers not subject to faults of prior automatic dampers, and dampers that are capable of maintaining desired pressure differences throughout a wide range of damper movement.

Automatic swinging dampers of the butterfly type heretofore commonly employed have the fault that they behave erratically, particularly as they approach their full-open positions. My invention eliminates this and like faults from automatic valves of this type by so arranging the damper that in every position of the damper, including the full-open position, a substantial amount of the damper-operating area is exposed to the fluid flow in such a relation that in every position the flow of fluid over the damper exerts a considerable turning effort on the damper. It will be observed that this feature of my invention is applicable regardless of whether or not the automatic valve or damper is intended to maintain a constant pressure difference.

The relation of a passage containing the automatic damper or valve to associated fluid-carrying passages may require compensation. Means for compensating for variations thus introduced are provided for also as hereinafter explained.

A specific application of my invention to a heating furnace, with some preferred details of construction, are shown in the accompanying drawing in which Fig. 1 is a diagrammatic illustration of a damper applied to a furnace to control the effect of the chimney suction on the furnace; Fig. 2 is an elevation of my preferred form of my damper, showing the same partly open; Fig. 3 is a vertical section of the device of Fig. 2; Figs. 4, 5 and 6 are sectional details on lines IV—IV, V—V and VI—VI of Fig. 2 respectively; Fig. 7 is a diagrammatic illustration of another form of damper installation in connection with a furnace; and Fig. 8 is a sectional detail on the line VIII—VIII of Fig. 2.

The movable damper or valve 1 shown is mounted in a frame 2 for ready installation; this frame 2 is circular and provided with a projecting lip 3 for insertion into the open end of, say, a T-connection 4 to a smoke pipe 5 of a house-heating furnace 6, Fig. 1. The damper is mounted to turn on a horizontal axis which is placed somewhat above the center of the damper so that the suction of the chimney on the furnace and damper can swing the damper to admit air to the chimney. Preferably, to simplify the design and the securing of the desired relations of the damper-turning forces, this axis in such a damper is placed as nearly as possible midway between the two faces of the damper, rather than along the outside of one face. This placement of the axis can be obtained conveniently by forcing up narrow strips 7 of the metal of the damper 1 into loop form at one face (Figs. 2 and 5) and intermediate narrow strips 8 into corresponding loop forms at the opposite face (Figs. 2 and 4), and inserting pins 9 tightly into the holds thus provided; to provide bearings having as little friction as convenient, the projecting ends of these pins can be pointed and mounted in hollow ends of bolt-like members 10 threaded through bosses 11 projecting from the damper frame. Also to simplify the design and the securing of the desired force relations and adjustment of these forces, I preferably use a counterbalancing weight 15, say attached to the damper 1 above its hinge or axis by the screw 16, to equalize the weights and the distribution of the weights of the parts of the damper above and below the axis 9—9 so that there is substantially no tendency for the damper to move toward open or closed position due to the action of gravity on the damper. The outer surface 17 of the frame 2 above the damper axis, and the inner surface 18 of an inturned flange 14 on the frame below that axis, provide seats against which the damper closes in its vertical position. Another weight 19 serves to move the damper to its vertical or closed position against this seat, except as the damper is displaced therefrom by the air flow through the device. Preferably this weight is adjustable toward and from the damper axis in order that the permissible suction effect of the chimney on the furnace may be increased or decreased at will; also for reasons explained hereinafter the angular relation between the line joining the damper axis and the center of gravity of this weight 19 preferably is kept the same through all these adjustments, and preferably for convenience the weight distance from the axis is adjustable from the outside; in order to obtain these results readily I prefer to fix the weight 19 to a straight threaded rod 20 threaded through the exact axis of the damper at the proper angle (hereinafter described) and provide its outer end with a head 21 whereby it can be screwed back and forth through the damper as adjustment of the weight 19 may require. An enlargement 22 on the end of the counterweight 15 is a convenient way of providing an adequate bearing for the rod 20; if this enlargement is circular in section crosswise of and centered about the axis as shown, it will have no effect on the damper operation. Insofar as the weight of the head 21 offsets the weight of 19, the latter can be increased. Since the part of the damper 1 below its axis is of greater area than the part above the axis, it is evident that the suction or draft of the chimney to which the smoke pipe 5 of the furnace is connected will tend to open the damper by moving its lower edge inwardly and its upper edge outwardly. An increase in the suction opens the damper wider; a reduction in the suction permits weight 19 to move the damper toward its seat 17—18 or closed position. While the damper is open air flows above and below the damper and thence into the smoke pipe 5 and this in turn reduces the effect of the chimney suction on the furnace as will be understood.

To expose a substantial amount of the area of the damper to the fluid flow in such a relation that the flow exerts considerable damper-turning effort in all positions of the damper, a substantial part of the area of the damper which faces the fluid flow (the left hand face of part 25 in Fig. 3) is so placed that it extends at an angle to the general direction of the fluid flow in all possible positions of the damper; in other words, at least a considerable area of the damper is so related to the flow path that this area extends transverse to the direction of the difference of pressure in all possible damper positions. It will be recognized that both the general direction of the flow of the fluid and the direction of the difference in pressure are horizontal and from left to right in Fig. 3. The bending of the part 25 of the damper outwardly provides for this effect; obviously in all positions of the damper, including the full-open position indicated by the broken lines 26 in Fig. 3, the flowing fluid striking the part 25, will exert considerable force on the damper tending to turn the same. Consideration will show that constructions other than such bends as 25 will serve the same purpose. The portion 25 can comprise more or less of the whole damper. Also the angular relation to the direction of the fluid flow can be different from that illustrated. Preferably however, with the butterfly type of damper illustrated, I bend or otherwise offset the part 25 to an angle of about forty-five degrees from the direction of the suction (considering the damper as closed), and I incorporate in the bent or offset part 25 an area approximately equal to the difference between the area of the damper below the horizontal axis 9—9 and the area of the damper above this axis; that is to say, the angle between the part 25 and the remainder of the damper 1, Fig. 3 is preferably about 135°, and the area of the part of the damper indicated by the bracket 27, Fig. 3, equals approximately the area of the part indicated by the bracket 28. As a result of so arranging the damper that the fluid flow exerts a considerable turning effort on the damper in all positions of the latter, there is no erratic action by the damper in any part of its range of operation, but in every part of its range its movement is smooth and controlled; and also the damper closing force (e. g., the weight 19) can be permitted to exert considerable damper-closing effort on the damper when the latter is in its full-open position, and thus enabled to start the damper away from this position promptly when the need arises.

The weight 19 not only applies the external or additional damper-turning forces necessary to turn the damper toward its closed position, but also the forces necessary to maintain the desired effect of the chimney suction on the furnace 6. The weight 19 is an example of an externally applied additional force mounted on a lever arm and turning in a vertical arc so that its turning effort on the damper varies with the position of the damper; variation of the additional turning effort with damper position is usually required, as before indicated. In the special case of a damper shaped and related to its casing and seat and counterbalanced like the damper 1 described above and illustrated in the drawing, I have found that it is generally sufficient to so set a weight 19 that the line from its center of gravity to the axis 9—9 of the damper is at a certain specific angle to the body of the damper; specifically this angle is substantially thirty-seven and one-half degrees (37° 30'). As the damper 1 moves toward and to full-open position the turning effort of the weight first increases and then falls due to the weight moving, in the horizontal direction, first away from and then toward the damper axis; at the same time an apparent force due to the relation of the damper to its seat changes, and also the turning effort due to action of the chimney suction on the damper first increases (as part 25 of the damper moves to a position at right angles to the general direction of air flow) and then decreases again; with a counterbalanced damper of the shape and proportions and seat-lap about as indicated, the change in the turning effort exerted by a weight 19 set at the angle of thirty-seven and one-half degrees is generally sufficient to counteract and supplement such inherent forces of the damper to such a degree that the damper will hold the pressure differences or chimney suction 5 substantially constant, and at a value determined by the mass of the weight 19 and its distance from the damper axis. With other forms of dampers, the additional turning effort needed to maintain the pressure difference substantially constant may vary in a more complex way, and hence need to be provided for in a more complex manner.

When the fluid flow through an automatic damper joins another flow, the manner or angle at which the various flows are related may require compensation. The damper arrangements as shown in Fig. 1 and Fig. 7 are illustrative. In Fig. 1 the air flow through the damper and the T-connection 4 joins the upward flow from the furnace 6 at right angles. In Fig. 7 a horizontal piece of pipe 32 leads the furnace gases from the furnace 33, joining the vertical portion of a smoke pipe at 34, while the connection 35 enters the pipe 32 at an angle less than a right angle so that the flows from the furnace and through the damper at the end of the connection 35 blend into each other more gradually than in the case of the T-connection of Fig. 1. A damper constructed to maintain a fixed pressure difference or chimney suction as above described for example, will usually require further compensation for such different modes of installation. Generally speaking, a turning effort that acts in a direction to close the damper and that increases proportionally with the opening of the damper will suffice to adapt such a damper to any installation that requires compensation, and by adjusting the value of this turning effort the damper can be adapted to whatever installation may be employed. For example, a weight that can be adjusted from the damper axis 9—9 to various points below this axis, or that is otherwise mounted to secure the same effect, is sufficient to enable a damper to be used with various such types of installation. When this weight is mounted on the damper, preferably it is divided into two equal parts 38 and 39 located at the opposite sides of the damper axis (Fig. 8) so as to exert no turning effort if and as the damper comes to a vertical position. For adjustment purposes, the two halves are conveniently made in the form of two like elongated members 38 and 39, rigidly fastened together by a pivot 40 (Figs. 2 and 8) that can turn in the body of damper 1, the axis of this pivot crossing the axis 9—9 of the damper at right angles; by setting the two members somewhat tightly to the faces of the damper the weight will be held by friction in whatever position it may be turned to. Generally speaking, such compensation will not be required if the two fluid flows blend into each other sufficiently gradually; in an installation where this occurs, the double-weight 38—39 can be turned until both halves lie parallel to the damper axis 9—9; in this position it exerts no turning effort on the damper in any position of the latter, because in every position the mass of the weight is uniformly distributed around that axis. For any other installation where the blending of the two fluid flows is not so gradual, the double-weight 38—39 can be turned more or less downwardly until sufficient compensation is obtained. If desired, a scale 41 indicating various positions for the weight can be marked on one face of the damper.

It will be understood of course that the mention above of setting the weight 19 at an angle of thirty-seven and one-half degrees to the body of the damper presupposes that the damper is shaped, counterbalanced and related to its casing and seat in substantially the manner of the damper 1 as described and illustrated; as indicated above, this angle may be changed if, for example, a change is made in the lap of the damper on its seat 17, or in the angle of the section 25 to the body of the damper, or in the relative size of the bent section 25. In general my invention is not limited to the details of construction and operation described above and illustrated in the accompanying drawing, except as appears hereinafter in the claims.

I claim:

1. In a device for fluid flow, a damper, means to hinge said damper on an axis extending crosswise of the damper at one side of the center of the damper, at least a portion of the part of the damper at the opposite side of said center being extended forwardly and at an angle of less than one hundred eighty degrees to the remainder of the damper, and a weight hinged to turn in an arc as the damper opens and closes, said weight being, when the damper is in its closed position, below the horizontal plane of the center about which it turns and, when the damper is in its full-open position, being above said horizontal plane.

2. In a device for fluid flow, a damper having a substantially flat body portion and a portion angled forwardly from the body portion, means to hinge said damper on an axis extending crosswise of said body portion above the center of the damper, said forwardly extending portion of the damper being at the opposite side of the damper center from said axis, and a weight arm extending to the rear of the damper from said axis and also extending downwardly when said damper is in its closed position.

3. The subject matter of claim 2 characterized by the fact that said weight arm includes a rod movable endwise through said axis for adjustment.

4. The subject matter of claim 2, characterized by the fact that said axis is so disposed that substantially one-half the exposed area of said body portion of the damper lies at one side of the axis and the remainder at the opposite side of the axis.

5. In a device for fluid flow, a damper having a substantially flat body portion and a portion extended forwardly from the body portion and making an angle of about one hundred thirty-five degrees with the face of said body portion, means providing an axis extending across said body portion and so disposed that substantially one half the area of the face of said body portion is above the axis and the other half below the axis, said bent portion of the damper being below the axis, seat means for the damper in closed position, and a weight arm extending to the rear of the damper and having the line joining its center of gravity to said axis located at an angle of about thirty-seven and one half degrees with the face of the body portion of the damper.

6. In a device of the kind described, a damper comprising, at least in part, a substantially flat plate, means providing an axis for the damper passing through said flat plate substantially midway between its two faces, and adjustable means to adapt the damper to different types of installation including two weights adjustable toward and from said axis, one movable along each of the two faces of said plate.

JOHN F. LAWSON.